United States Patent
Jin et al.

(10) Patent No.: US 10,304,362 B2
(45) Date of Patent: May 28, 2019

(54) LIQUID CRYSTAL PANEL FOR 3D DISPLAY, DRIVING METHOD AND PIXEL OPTIMIZATION METHOD THEREOF

(71) Applicant: Shenzhen China Star Optoelectronics Technology Co., Ltd., Shenzhen (CN)

(72) Inventors: Yufeng Jin, Shenzhen (CN); Shen Sian Syu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 176 days.

(21) Appl. No.: 15/327,312

(22) PCT Filed: Dec. 21, 2016

(86) PCT No.: PCT/CN2016/111344
§ 371 (c)(1),
(2) Date: Jan. 18, 2017

(87) PCT Pub. No.: WO2018/040403
PCT Pub. Date: Mar. 8, 2018

(65) Prior Publication Data
US 2018/0350282 A1    Dec. 6, 2018

(30) Foreign Application Priority Data

Aug. 31, 2016 (CN) .......................... 2016 1 0791990

(51) Int. Cl.
*G09G 5/02* (2006.01)
*G09G 3/00* (2006.01)
(Continued)

(52) U.S. Cl.
CPC ............. *G09G 3/003* (2013.01); *G02F 1/133* (2013.01); *G02F 1/1335* (2013.01);
(Continued)

(58) Field of Classification Search
CPC ...... G09G 3/3611; G09G 3/36; G09G 3/3659; G09G 2340/0457
See application file for complete search history.

(56) References Cited

U.S. PATENT DOCUMENTS

| 8,791,988 B2 * | 7/2014 | Chae ...................... G02B 27/22 348/51 |
| 8,957,893 B2 * | 2/2015 | Yang .................... H04N 13/337 345/419 |

(Continued)

FOREIGN PATENT DOCUMENTS

| CN | 102338953 A | 2/2012 |
| CN | 102540546 A | 7/2012 |

(Continued)

OTHER PUBLICATIONS

International Search Report for related International Application No. PCT/CN2016/111344, report dated Dec. 21, 2016; (14 pages).

*Primary Examiner* — Vijay Shankar

(57) ABSTRACT

Disclosed is a liquid crystal panel for 3D display, a driving method and a pixel optimization method thereof. The liquid crystal panel includes a display panel and an FPR film attached to a surface of the display panel. The FPR film is divided into first areas and second areas, the first areas and the second areas being arranged alternately in a direction parallel to lines of the sub-pixel units of the display panel, and each covering two lines of sub-pixel units. The liquid crystal panel can reduce the production cost of the 3D display device and improve the resolution.

3 Claims, 3 Drawing Sheets

(51) Int. Cl.
  *G02F 1/133*     (2006.01)
  *G02F 1/1335*    (2006.01)
  *G02F 1/13363*   (2006.01)
  *G09G 3/36*      (2006.01)

(52) U.S. Cl.
  CPC ....... *G02F 1/13363* (2013.01); *G09G 3/3607* (2013.01); *G02F 2201/52* (2013.01); *G09G 3/3611* (2013.01); *G09G 2340/0457* (2013.01)

(56) References Cited

U.S. PATENT DOCUMENTS

| | | | |
|---|---|---|---|
| 2007/0058113 A1 | 3/2007 | Wu et al. | |
| 2012/0013610 A1* | 1/2012 | Chae | G02B 27/22 345/419 |
| 2013/0335305 A1* | 12/2013 | Yang | H04N 13/337 345/32 |
| 2014/0078186 A1* | 3/2014 | Chen | G09G 3/003 345/690 |
| 2014/0320775 A1* | 10/2014 | Ishiguro | G02B 27/26 349/15 |
| 2016/0014401 A1* | 1/2016 | Son | H04N 13/356 345/694 |

FOREIGN PATENT DOCUMENTS

| | | |
|---|---|---|
| CN | 102722033 A | 10/2012 |
| CN | 104464684 A | 3/2015 |
| CN | 105280132 A | 1/2016 |
| CN | 106200099 A | 12/2016 |

\* cited by examiner

LIQUID CRYSTAL PANEL FOR 3D DISPLAY, DRIVING METHOD AND PIXEL OPTIMIZATION METHOD THEREOF

CROSS-REFERENCE TO RELATED APPLICATIONS

This application claims the priority of Chinese patent application CN201610791990.4, entitled "Liquid Crystal Panel for 3D Display, Driving Method and Pixel Optimization Method Thereof" and filed on Aug. 31, 2016, the entirety of which is incorporated herein by reference.

FIELD OF THE INVENTION

The present disclosure relates to the field of liquid crystal display devices, and in particular, to a liquid crystal panel for 3D display, a driving method and a pixel optimization method thereof.

BACKGROUND OF THE INVENTION

With the development of 3D display technology, the 3D display device has gradually become a general requirement and configuration. As a universal implementation mode of 3D, users of an FPR (Film-type Patterned Retarder) liquid crystal display device have put forward higher requirements for 3D applications, and so developers are committed to producing display products with high definition and low cost to occupy the market.

High definition and low cost are a pair of contradictory factors because in the prior art, with the increase in the resolution of a 3D display device, the process of the FPR film becomes more and more difficult, which will inevitably lead to an increased production cost. The present disclosure provides a solution to the above technical problem.

SUMMARY OF THE INVENTION

One of the technical problems to be solved by the present disclosure is to provide a 3D display solution capable of reducing the 3D display cost while improving the display definition.

In order to solve the above technical problem, embodiments of the present disclosure first provide a liquid crystal panel for 3D display, comprising a display panel and an FPR film attached to a surface of the display panel. The display panel is provided with orthogonally arranged multi-line, multi-column sub-pixel units. The FPR film is divided into first areas for left-eye picture display and second areas for right-eye picture display, the first areas and the second areas being arranged alternately in a direction parallel to lines of the sub-pixel units, and the first areas and the second areas arranged alternately each covering two lines of sub-pixel units.

Preferably, the sub-pixel units present a PenTile arrangement.

Preferably, the PenTile arrangement comprises one of an RWBG arrangement, an RGBY arrangement, an RGBG arrangement and an RGBW arrangement.

Embodiments of the present disclosure further provide a driving method for driving a liquid crystal panel, comprising: during display of one frame of picture, sequentially driving the sub-pixel units covered by the first areas and the second areas of the FPR film arranged alternately; and displaying left-eye pictures using the sub-pixel units covered by the first areas, and displaying right-eye pictures using the sub-pixel units covered by the second areas.

Preferably, the driving method comprises: when driving the sub-pixel units covered by the first areas, sequentially transmitting respective lines of the left-eye pictures to a first line of sub-pixel units and a second line of sub-pixel units in the first areas; and when driving the sub-pixel units covered by the second areas, sequentially transmitting respective lines of the right-eye pictures to a first line of sub-pixel units and a second line of sub-pixel units in the second areas.

Preferably, the driving method is applicable to full high definition display and ultra-high definition display.

On the other hand, a pixel optimization method of a liquid crystal panel is provided, the liquid crystal panel comprising a display panel and an FPR film attached to a surface of the display panel. The display panel is provided with orthogonally arranged multi-line, multi-column sub-pixel units. The FPR film is divided into first areas for left-eye picture display and second areas for right-eye picture display, the first areas and the second areas being arranged alternately in a direction parallel to lines of the sub-pixel units, and the first areas and the second areas arranged alternately each covering two lines of sub-pixel units. The sub-pixel units present a PenTile arrangement. The liquid crystal panel is displayed using a driving method of, during display of one frame of picture, sequentially driving the sub-pixel units covered by the first areas and the second areas of the FPR film arranged alternately; displaying left-eye pictures using the sub-pixel units covered by the first areas, and displaying right-eye pictures using the sub-pixel units covered by the second areas. The pixel optimization method comprises employing an SPR algorithm to perform a virtual resolution compensation for received left-eye picture data and right-eye picture data.

Preferably, the pixel optimization method comprises employing the SPR algorithm to perform the virtual resolution compensation for the received left-eye picture data and right-eye picture data, respectively.

Preferably, the pixel optimization method is applicable to full high definition display and ultra-high definition display.

Compared with the prior art, one or more embodiments in the above solution may have the following advantages or beneficial effects:

By using the FPR film covering two lines of sub-pixel units to manufacture a liquid crystal panel, and combining the 2Line-by-2Line driving method and the SPR algorithm to perform picture display on the liquid crystal panel, it is possible to reduce the production cost of the 3D display device, increase the resolution and improve the displayed picture quality.

Other advantages, objects and features of the present disclosure at some extent will be illustrated in the following description, and to some extent, will be obvious to those skilled in the art based on the study of the following, or can be taught from the practice of the present disclosure. The objects and other advantages of the present disclosure can be achieved and obtained by the structures particularly pointed out in the following description, claims, and accompanying drawings.

BRIEF DESCRIPTION OF THE DRAWINGS

The accompanying drawings are used to provide a further understanding of the technical solution of the present disclosure or the prior art, and constitute a part of the description, wherein the accompanying drawings illustrating the embodiments of the present disclosure are used in conjunc

DETAILED DESCRIPTION OF THE EMBODIMENTS

The implementation mode of the present disclosure will be described in detail below with reference to the accompanying drawings and embodiments, by means of which, the implementation process regarding how the present disclosure uses technical means to solve the technical problem and achieve the corresponding technical effect can be fully understood and implemented accordingly. The embodiments of the present disclosure and respective features in the embodiments can be combined with each other under the condition of no conflict, and the formed technical solutions are all within the protection scope of the present disclosure.

Figure 1:
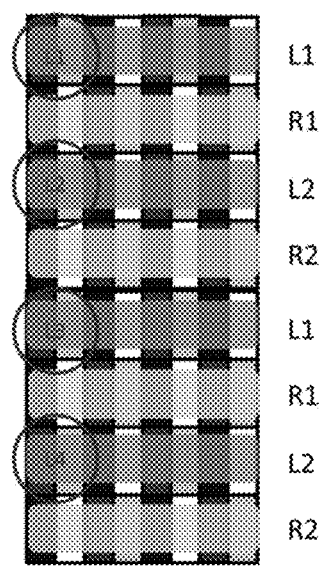
- FIG. 1 is a structural schematic diagram of a liquid crystal panel for FPR 3D display in the prior art.

FIG. 1 is a structural schematic diagram of a liquid crystal panel for FPR 3D display in the prior art. An LCD TV using FPR 3D display technology typically produces two images through an FPR film attached to the surface of the liquid crystal display panel (or the surface of the liquid crystal display), corresponding to a left-eye image and a right-eye image, respectively, and then synthesizes the left-eye image and the right-eye image with a 3D tool (i.e., glasses) to create a whole 3D image to achieve 3D experience.

As shown in FIG. 1, the dark stripes of different gray levels in this figure are L1, R1, L2, R2, etc., which represent the portions of the FPR film used to form different polarizations. It can be seen that in the prior art, generally the left-eye image and the right-eye image are respectively outputted through line-by-line scanning of odd-even lines, wherein odd lines (or even lines) of the picture L1, L3, L5 . . . are outputs of the left-eye image, and R1, R2, R5 . . . are outputs of the right-eye image.

Further, as shown in FIG. 1, if a high-resolution display panel is used in order to achieve high-definition display, the widths of the dark stripes of the FPR film will become narrower, thereby resulting in an increase in the processing difficulty and an increase in the processing cost. Thus, its application is restricted. The present disclosure provides an improved FPR 3D liquid crystal panel to solve the above problem, which will be described below in detail with reference to specific embodiments.

First Embodiment

Figure 2:
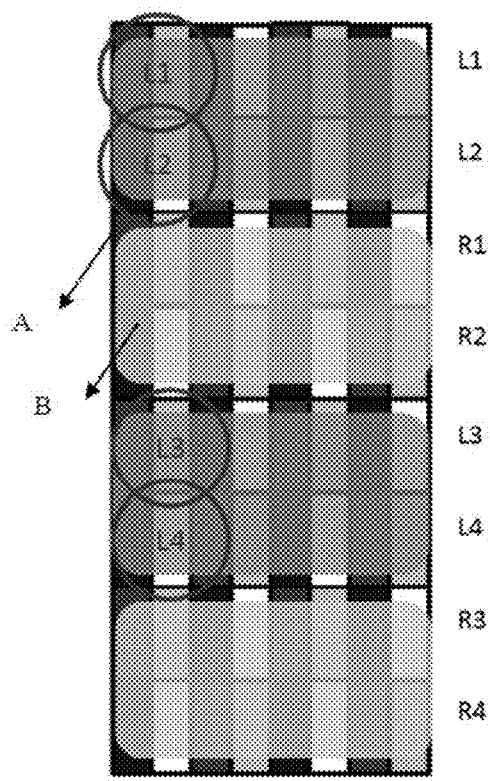
FIG. 2 is a structural schematic diagram of a liquid crystal panel for 3D display according to the first embodiment of the present disclosure.

FIG. 2 is a structural schematic diagram of a liquid crystal panel for 3D display according to the first embodiment of the present disclosure. As shown in FIG. 2, the liquid crystal panel comprises a display panel A and an FPR film B attached to a surface of the display panel.

The display panel A is provided with orthogonally arranged multi-line, multi-column sub-pixel units, and the sub-pixel units receive the image data through scanning lines and data lines to display the pictures.

The FPR film B is also divided into first areas for left-eye picture display and second areas for right-eye picture display. As shown in FIG. 2, the dark stripes with darker gray represent the first areas and the dark stripes with lighter gray represent the second areas; the first areas and the second areas are arranged alternately in a direction parallel to lines of the sub-pixel units, and the first areas and the second areas arranged alternately each cover two lines of sub-pixel units.

It can be seen from FIG. 2 that the pitches of the first areas represented by the dark stripes with darker gray and the second areas represented by the dark stripes with lighter gray all reach about twice the pitch of the FPR film in the prior art. In the FPR film manufacturing process, covering is performed for the pixel level of the display device. For a display device with a higher resolution, the area of the pixel is smaller, and thus the pitch of the FPR film is smaller; it is understandable that it will be more difficult to manufacture it. However, in this embodiment, the pitch of the FPR film is increased by about one time, and thus its processing difficulty will be reduced, which contributes to improving the yield rate of the product and reducing the production cost.

Second Embodiment

Figure 3:
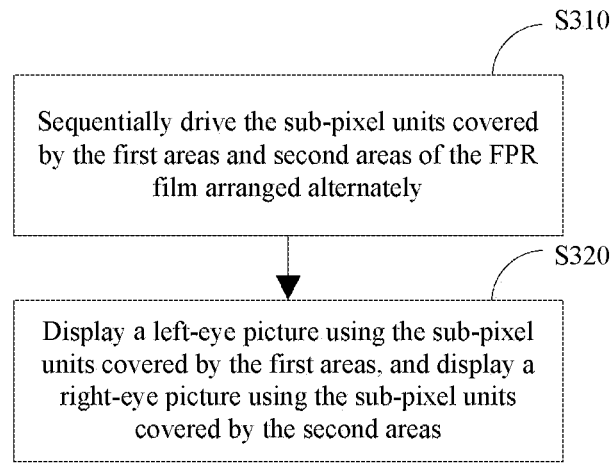
FIG. 3 is a flow schematic diagram of a driving method for driving a liquid crystal panel for 3D display according to the second embodiment of the present disclosure.
Figure 4:
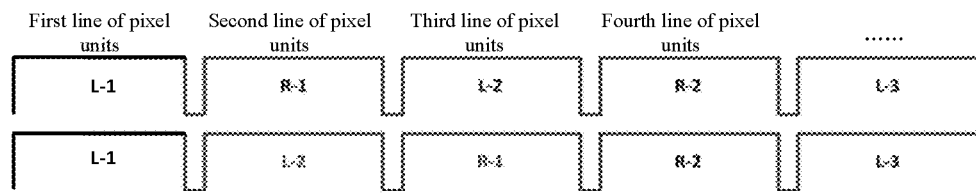
FIG. 4 is a data transmission sequence diagram of a driving method for driving a liquid crystal panel for 3D display according to the second embodiment of the present disclosure.

FIG. 3 is a flow schematic diagram of a driving method for driving a liquid crystal panel for 3D display according to the second embodiment of the present disclosure. FIG. 4 is a data transmission sequence diagram of a driving method for driving a liquid crystal panel for 3D display according to the second embodiment of the present disclosure, and the driving method comprises the following steps.

In Step S310, the sub-pixel units covered by the first areas and the second areas of the FPR film arranged alternately are sequentially driven.

In Step S320, left-eye pictures are displayed using the sub-pixel units covered by the first areas, and right-eye pictures are displayed using the sub-pixel units covered by the second areas.

Specifically, with reference to FIG. 2 and FIG. 4, the scanning lines in respective lines are driven in an order from top to bottom for picture display; when driving the first areas covering the first line of sub-pixel units and the second line of sub-pixel units, respective lines of the left-eye pictures are sequentially transmitted to the first line of sub-pixel units and the second line of sub-pixel units in the first areas, that is, when scanning the first line of sub-pixel units, the left-eye picture L1 is transmitted; when scanning the second line of sub-pixel units, the left-eye picture L2 is transmitted.

Then, proceeding to the display of the right-eye pictures, when driving the second areas covering the third line of sub-pixel units and the fourth line of sub-pixel units, respective lines of the right-eye pictures are sequentially transmitted to the first line of sub-pixel units and the second line of sub-pixel units in the second areas, that is, when scanning the third line of sub-pixel units, the right-eye picture R1 is transmitted; when scanning the fourth line of sub-pixel units, the right-eye picture R2 is transmitted.

Further as shown in FIG. 2, when driving the first areas covering the fifth line of sub-pixel units and the sixth line of sub-pixel units, respective lines of the left-eye pictures are sequentially transmitted to the first line of sub-pixel units and the second line of sub-pixel units in the first areas, that is, when scanning the fifth line of sub-pixel units, the left-eye picture L3 is transmitted; when scanning the sixth line of sub-pixel units, the left-eye picture L4 is transmitted.

When driving the second areas covering the seventh line of sub-pixel units and the eighth line of sub-pixel units, respective lines of the right-eye pictures are sequentially transmitted to the first line of sub-pixel units and the second line of sub-pixel units in the second areas, that is, when scanning the seventh line of sub-pixel units, the right-eye picture R3 is transmitted; when scanning the eighth line of sub-pixel units, the right-eye picture R4 is transmitted.

The above cycle is repeated in the following driving process.

The driving method for achieving the 3D display in the embodiment of the present disclosure can be applied to Full High Definition (FHD) display and Ultra High Definition (UHD) display.

With the same size, supposing that each line pitch of the ultra high definition display panel is 1, then each line pitch of the full high definition display panel is 2. If employing the technical solution in the embodiment of the present disclosure, the maximum line pitch of the ultra high definition display panel will become 2, that is, its maximum line pitch is the same as the each line pitch of the full high definition display panel. In the prior art, the full high definition FPR mode 3D panel has existed, and its effect is good, which indicates that the human eye can adapt to each line pitch thereof. Thus, the driving method for achieving 3D display in the embodiment of the present disclosure can be applied to the full high definition display panel, and will not cause discomfort to the human eye.

Third Embodiment

Further, when the display panel with the pixel structure presenting a PenTile arrangement is employed as the liquid crystal panel in the embodiment of the present disclosure, it is possible to improve its resolution by a virtual pixel compensation means.

PenTile is a kind of pixel arrangement mode developed by Samsung Corp, and it was firstly applied to the mobile phone of an OLED material. Different from a single sub-pixel unit in the standard RGB arrangement, the sub-pixel unit in the standard RGB arrangement consists of three sub-pixels of red, green and blue, while there are only two kinds of sub-pixel units of PenTile and each kind of sub-pixel unit contains two colors.

Figure 5:
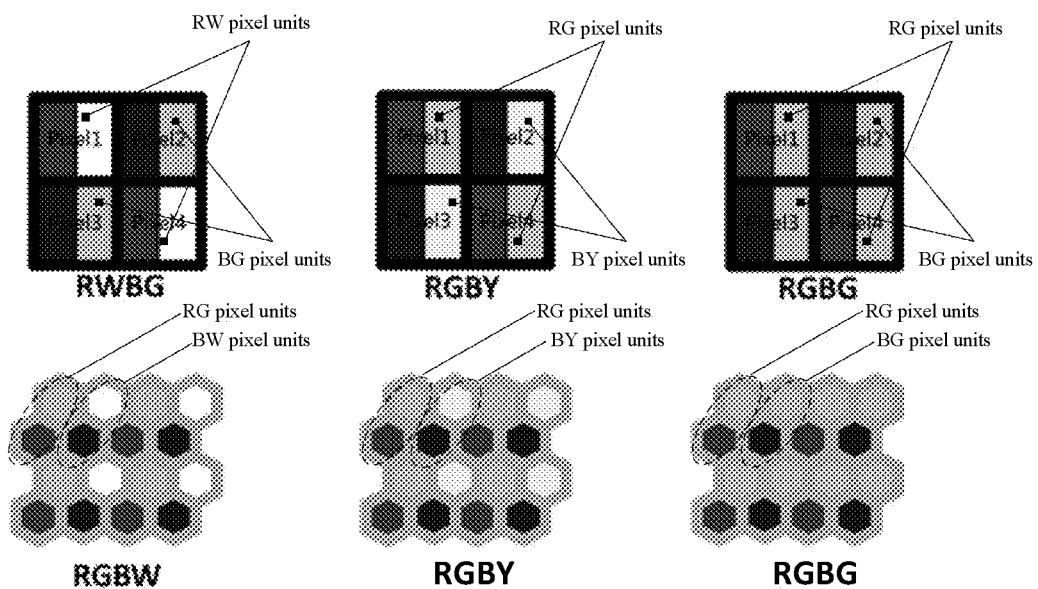
FIG. 5 is a schematic diagram of an arrangement form that the sub-pixel units present a PenTile arrangement.

As shown in FIG. 5, several examples of the PenTile arrangement mode are provided, in which two sub-pixel units of the RWBG are Red-White (RW) and Blue-Green (BG); Pixel 1 and Pixel 4 in this figure are RW pixel units; Pixel 2 and Pixel 3 are BG pixel units; and the two kinds of pixel units are arranged alternately along the direction of the line, and are arranged in a staggered manner along the direction of the column.

For another example, two sub-pixel units of the RGBY are Red-Green (RG) and Blue-Yellow (BY); Pixel 1 and Pixel 4 in this figure are RG pixel units; Pixel 2 and Pixel 3 are BY pixel units; and the two kinds of pixel units are arranged alternately along the direction of the line, and are arranged in a staggered manner along the direction of the column. RGBG is similar.

The second row in FIG. 5 further shows three PenTile arrangement modes of RGBW, RGBY and RGBG. The sub-pixel units Red-Green (RG) and Blue-White (BW) of RGBW are parallel to each other, and the different colors of the sub-pixel units are mutually staggered. The dashed boxes in this figure circle the RG sub-pixel units and the BW sub-pixel units, respectively. RGBY and RGBG are similar.

As shown in FIG. 5, each PenTile arrangement mode forms an RGBW (or RWBG, RGBY, RGBG) pixel group through two sub-pixel units in a horizontal direction, and also forms an RGBW (or RWBG, RGBY, RGBG) pixel group through two sub-pixel units in a vertical direction; in view of the above characteristics, an SPR (Sub-Pixel Rendering) algorithm is proposed in the prior art to improve the virtual resolution.

Figure 6A:
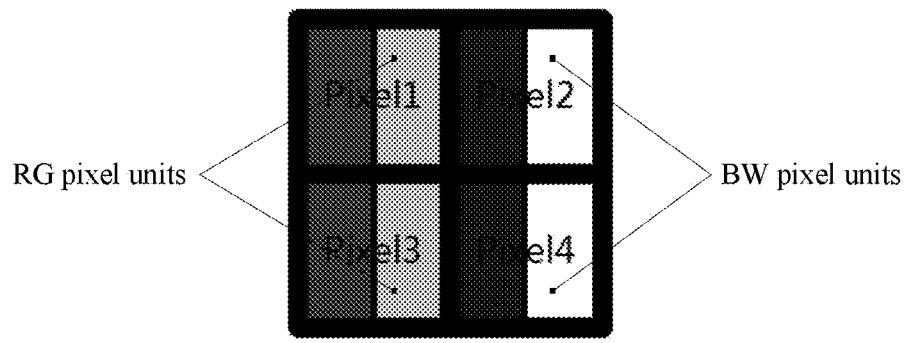
FIG. 6*a* is a schematic diagram of an equivalent arrangement of sub-pixel units when using the driving method of the prior art for 3D display.

The 1Line-by-1Line driving mode in the prior art is to respectively display the left-eye picture or the right-eye picture in odd lines (or even lines). For the PenTile panel, its horizontal and vertical sub-pixel units actually have been changed into the arrangement mode as shown in FIG. 6a, and the SPR algorithm can no longer be used to improve the picture quality and enhance the resolution.

Figure 6B:
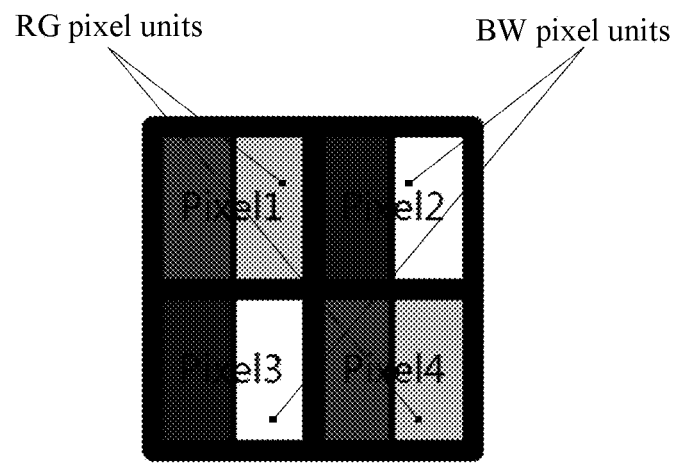
FIG. 6*b* is a schematic diagram of an equivalent arrangement of sub-pixel units when performing the pixel optimization method of a liquid crystal panel according to the third embodiment of the present disclosure.

However, in the embodiment of the present disclosure, as shown in FIG. 6b, since the 2Line-by 2Line driving mode is used, when the sub-pixel units present a PenTile arrangement, its horizontal and vertical structures are not destroyed. Thus, it is possible to employ an SPR algorithm to perform a virtual resolution compensation for received left-eye picture data and right-eye picture data to thereby increase the definition of the display.

Further, with reference to the driving process of FIG. 2 and FIG. 4, respectively for displaying the left-eye picture data and displaying the right-eye picture data, the horizontal and vertical structures of the PenTile arrangement are not destroyed. That is to say, for the embodiment of the present disclosure, it is also possible to employ the SPR algorithm to perform the virtual resolution compensation for the received left-eye picture data and right-eye picture data, respectively, to thereby increase the definition of the display.

Through the combination of the 2Line-by-2Line driving mode and the SPR pixel optimization algorithm in the embodiments of the present disclosure, it is possible to improve the display effect and achieve an enhancement from a resolution 1920*4*2160 to a resolution 3840*3*2160.

The embodiments of the present disclosure can be applied to the video playback system and monitoring system with the full high definition display and the ultra-high definition display so that when the cost of the 3D display product is reduced, the image quality thereof is greatly improved, which is helpful to promote the 3D technology more into practical application fields.

Although the embodiments disclosed by the present disclosure are described as above, the described contents are merely implementation modes employed for the purpose of facilitating the understanding of the present disclosure, and are not intended to limit the present disclosure. Any person skilled in the technical field of the present disclosure could make any modification and variation in the implementation forms and details, without departing from the spirit and scope of the present disclosure, but the patent protection scope of the present disclosure still needs to be based on the scope as defined in the appended claims.

The invention claimed is:
1. A pixel optimization method of a liquid crystal panel for 3D display,
  wherein the liquid crystal panel for 3D display comprises a display panel and a Film-type Patterned Retarder film attached to a surface of the display panel,
    wherein the display panel is provided with orthogonally arranged multi-line, multi-column sub-pixel units;
    wherein the Film-type Patterned Retarder film is divided into first areas for left-eye picture display and second areas for right-eye picture display, the first areas and the second areas being arranged alternately in a direction parallel to lines of the sub-pixel units, and the first areas and the second areas arranged alternately each covering two lines of sub-pixel units;
      wherein the sub-pixel units present a PenTile arrangement;
  wherein the liquid crystal panel for 3D display is displayed using a driving method of, during display of one frame of picture,
    sequentially driving the sub-pixel units covered by the first areas and the second areas of the Film-type Patterned Retarder film arranged alternately;
    displaying left-eye pictures using the sub-pixel units covered by the first areas, and
    displaying right-eye pictures using the sub-pixel units covered by the second areas; and
  wherein the pixel optimization method comprises:
    employing Sub-Pixel Rendering algorithm to perform a virtual resolution compensation for received left-eye picture data and right-eye picture data.

2. The pixel optimization method according to claim 1, further comprising employing the Sub-Pixel Rendering algorithm to perform the virtual resolution compensation for the received left-eye picture data and right-eye picture data, respectively.

3. The pixel optimization method according to claim 1, wherein the pixel optimization method is applicable to full high definition display and ultra-high definition display.

* * * * *